Nov. 28, 1950     R. E. FIELD     2,531,675
VEHICLE STEERING WHEEL LOCKING DEVICE
Filed Nov. 14, 1949
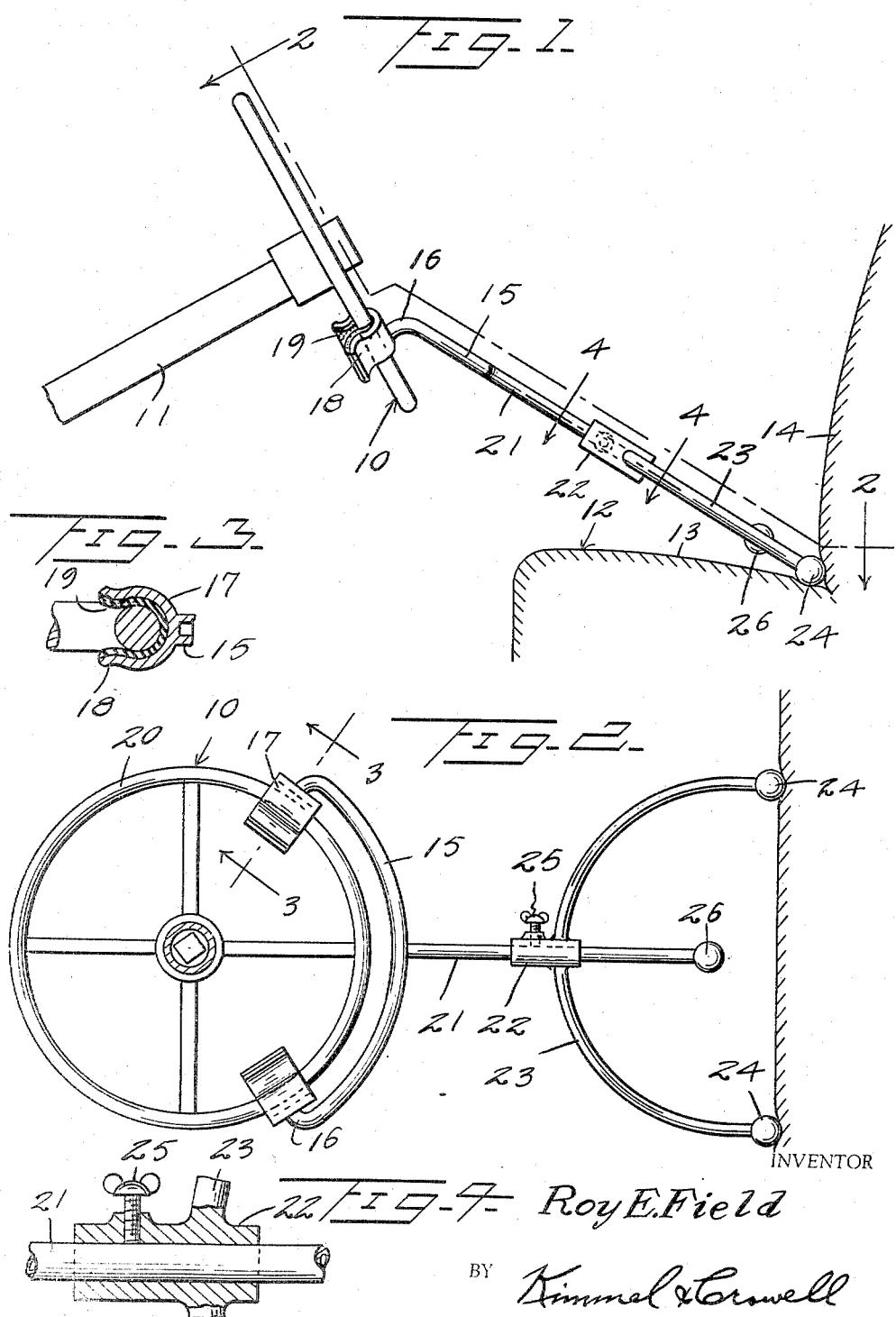
INVENTOR
Roy E. Field
BY Kimmel & Crowell
ATTORNEYS Patented Nov. 28, 1950

2,531,675

UNITED STATES PATENT OFFICE 2,531,675

VEHICLE STEERING WHEEL LOCKING DEVICE

Roy E. Field, Fullerton, Calif.

Application November 14, 1949, Serial No. 127,013

1 Claim. (Cl. 74—495)

This invention relates to a vehicle steering wheel locking device.

In the alignment of the front wheels of a vehicle it is necessary to firmly hold the steering wheel in a straight ahead position so that the steering wheel will not be in an off center position after the toe-in position of the wheels has been adjusted. It is, therefore, an object of this invention to provide a steering wheel holding or locking means which can be adjusted to fit any vehicle, the device being formed with wheel gripping clamps or clips and an adjustable wedging means for engagement with the back of the front seat.

Another object of this invention is to provide a steering wheel holding or locking device which includes a pair of oppositely disposed arcuate members connected together by a sliding and adjustable connection, one of the arcuate members having spring clips secured thereto for clamping onto the wheel.

With the above and other objects in view, my invention consists in the arrangement, combination and details of construction disclosed in the drawing and specification, and then more particularly pointed out in the appended claim.

In the drawing,

Figure 1 is a detail side elevation of a steering wheel holder or locking device constructed according to an embodiment of this invention, Figure 2 is a sectional view taken on the line 2—2 of Figure 1, Figure 3 is a fragmentary sectional view taken on the line 3—3 of Figure 2.

Figure 4 is a fragmentary sectional view taken on the line 4—4 of Figure 1.

Referring to the drawing, the numeral 10 designates generally a steering wheel which is carried by the steering column 11 and is positioned forwardly of the front seat generally designated as 12. The front seat 12 includes a seat member 13 and an upstanding cushioned back member 14.

In order to provide a means whereby the steering wheel 10 may be locked against turning so that the front wheels may be aligned or toed-in, I have provided a locking or holding means which is adapted to clamp onto the wheel 10 and to bind between the back seat 14 and the seat 12. This locking or holding means comprises a longitudinally curved tubular bar 15 which is formed with radially bent end portions 16 on which a pair of wheel clamping clips 17 are fixedly secured. The clips 17 are substantially U-shaped in transverse section, being formed with flared forward portions 18, and a cushion member 19 may be disposed on the inner surface of each clip 17 so that the clip may more firmly clamp onto the rim 20 of the wheel 10.

The curved bar 15 has fixed thereto and extending from the convex side thereof, an elongated tubular slide member 21 forming an extension member which slidably engages through a cylindrical sleeve 22. The sleeve 22 is interposed between the length of a longitudinally curved clamping or cramping bar 23 which has rubber feet or cushion members 24 mounted on the opposite or rear ends thereof. A bolt or set screw 25 is threaded through the sleeve 22 and is adapted to bind the extension bar 21 in selected extended or retracted position with respect to the base or cramping bar 23. The rear end of the slide bar 21 also has mounted thereon a rubber cushion foot or knob 26 which in a substantially retracted position of the extension bar 21 may contact with the forward side of the back 14.

In the use and operation of this device, the clips 17 are engaged over the rim or felly 20 of the wheel 10 and the cramping bar 23 is then adjusted with respect to the extension bar 21 so that the cramping bar 23 may be wedged tightly against the back 14. With the device in the position shown in Figures 1 and 2, the wheel 10 will be locked against rotation so that the front wheels may be properly adjusted without turning of the steering wheel 10. By providing the extensible connection formed by the extension bar 21 and the sleeve 22, this device can be readily adjusted to be mounted in substantially every make or type of vehicle which has a steering wheel and a front seat.

I do not mean to confine myself to the exact details of construction herein disclosed, but claim all variations falling within the purview of the appended claim.

What I claim is:

A vehicle steering wheel holding means for a vehicle having a steering wheel, a driver's seat, and a driver's seat back; comprising a pair of oppositely curved bars, a pair of wheel gripping clips carried by one of said bars, and extensible connecting means connected between said bars whereby the other of said bars may be wedgingly engaged with the vehicle seat.

ROY E. FIELD.

REFERENCES CITED

The following references are of record in the file of this patent:

UNITED STATES PATENTS

| Number | Name | Date |
|---|---|---|
| 1,531,638 | Zamberletti | Mar. 31, 1925 |
| 1,615,798 | Cowdrey | Jan. 25, 1927 |

OTHER REFERENCES

Vol. 92, issue 4, page 188, Motor, October 1949.